United States Patent Office 3,422,605
Patented Jan. 21, 1969

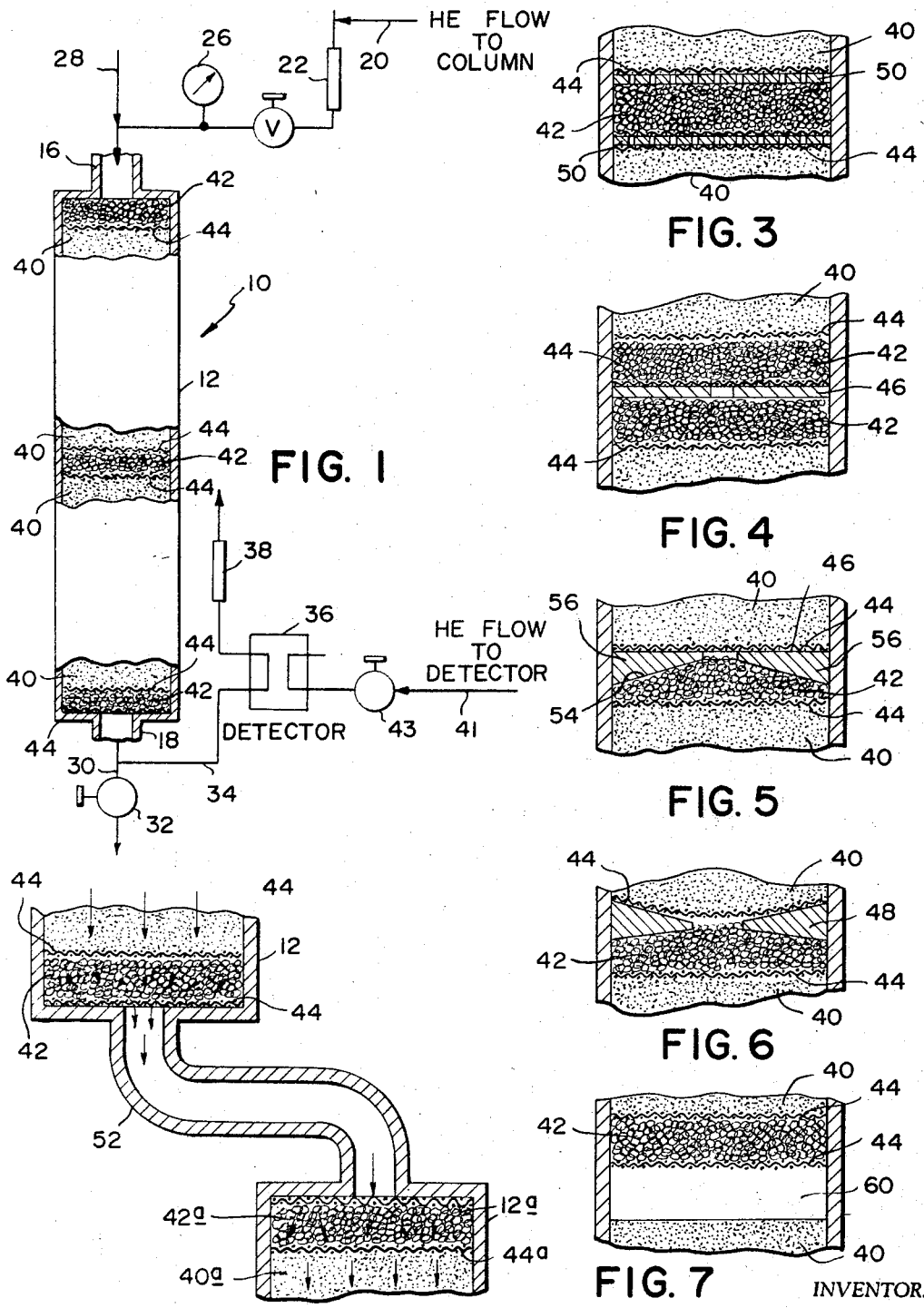

3,422,605
CHROMATOGRAPHIC COLUMNS
Richard P. Crowley, Milton, Mass., assignor to Abcor, Inc., Cambridge, Mass., a corporation of Massachusetts
Filed June 29, 1967, Ser. No. 650,126
U.S. Cl. 55—386                                    15 Claims
Int. Cl. B01d 15/08

ABSTRACT OF THE DISCLOSURE

An improved chromatographic column is provided which is particularly useful for relatively large diameter columns for both gas and liquid chromatography. The improved column contains a separate layer across the column diameter of sectionally interconnecting organic foam cellular material of the open cell type which permits the lateral flow and mixing of fluids passing axially through the column. The cellular layer generally consists of about 80% or more of essentially interconnecting individual cells of usually relatively uniform size. The cellular layer may be used in combination with both doughnut type baffles and baffles having a plurality of flow passages such as sieve plates, as well as with flat disc-like mixing spaces.

Background of the invention

One of the difficulties which has tended to suppress the employment of chromatographic techniques for the separation of materials on a commercial scale has been the tendency of chromatographic columns to lose resolving power and separatory ability as the diameter of the column increases. The scaling up of relatively small diameter laboratory analytical chromatographic columns of ¼ to 1 inch to relatively large diameter columns of four inches or more has often failed to give comparative separation or resolving power. In fact, in large diameter columns with both gas and liquid chromatographic techniques there is often a rapid diminution in effective separatory ability as the column diameter increases.

To improve the resolving power of chromatographic columns the use of various internal partition elements or obstructors has been first described in U.S. Patent No. 3,250,058, issued May 10, 1966, entitled "Method of and Apparatus for Chromatographic Separations" to Raymond Baddour. Particular arrangements of partition elements have also been described in later patents such as in South African Application 66/3,204 published Dec. 21, 1967, and in U.S. Patent No. 3,310,932, issued Mar. 28, 1967. Some partition elements previously described have used sieve alone and in combination with doughnut type elements within the chromatographic column with and without an empty mixing space between the elements to induce lateral flow and radial mixing and subsequent redistribution of the fluid streams flowing axially through the column. Partition elements containing a plurality of flow passages therein, such as sieve plates in pairs, and one or more elements in combination with a doughnut type element have been employed in sandwich type structures wherein a hollow flat disc-like mixing space is provided between the elements within the column.

Further, the use of grains of packing material having a cross-section dimension greater than one-fifth of the inner diameter of a chromatographic column has been suggested with analytical chromatographic columns of less than 1 mm. in diameter to greatly increase the speed of separation within the column by increasing the flow velocity of the fluid as set forth in U.S. Patent No. 3,283,483 to Halasz et al. issued Nov. 8, 1966. In this technique, a narrow capillary type chromatographic column entirely packed with very large size particles creates a series of open interstitial spaces between the particles connected by narrow passages around the particles, thereby greatly increasing the flow velocity of the streams through the connecting passages between the particles. Such technique has been directed only toward very narrow columns and requires certain criticality in both particle size relative to the internal diameter of the column as well as the interstitial void space.

Summary of the invention

My invention relates to an improved apparatus for the chromatographic separation of fluid streams and in particular to the apparatus for promoting the separation of materials in relatively large diameter chromatographic columns used for both gas and liquid chromatography.

I have discovered that the separatory ability and resolving power of chromatographic columns and particularly of relatively large diameter chromatographic columns is enhanced and improved by incorporating within the column distinct and separate layers of cellular material. These layers should extend preferably across the entire cross-sectional area of the internal column diameter and at defined intervals within the column or one or more column sections. The cellular layers are employed to periodically induce lateral flow of fluid streams moving through the column and to permit localized mixing of such streams within the layers. The use of such cellular layers permits better distribution of fluids due to the reduction in pressure drop as the fluid stream moves through the layers, while the interconnecting cellular structure of the layers promotes transverse mixing of the streams.

My cellular layers may be used alone or in combination with various partition elements containing one or more flow passages or employed in combination with empty mixing spaces directly up or down stream of the cellular layer, or in combination with layers of particulate material which varies in particle size from that of the separatory material employed within the column. My cellular layer may be employed in a similar manner as shown in my copending application Ser. No. 644,302, filed June 7, 1967, of the same title relating to the use of large size particulate materials in chromatographic columns. That application is hereby incorporated by reference in its entirety in this application.

The cellular layers may be employed within the packed bed of separatory material of a single column or one or more layers may be employed in a series of interconnecting columns. In general, depending upon the column diameter and the particular resolving power required, my layers may have a depth from about 10–100% of the internal column diameter and may vary in position and frequency in the column. The depth should be sufficient to improve the resolving power desired within each column or column section. It is often preferable to employ at least one layer at the inlet of the column and another layer at the outlet of the column particularly where there are interconnecting columns.

My cellular layers may also be profitably employed with a variety of partition elements such as sieve plates and/or doughnut type elements. For example, my cellular layers may be employed between a pair of sieve plates or other partition elements having one or a plurality of flow passages and where so employed the sieve plates need not have the flow passages substantially non-aligned with the flow passages of the preceding plate, since the intervening cellular layer will prevent the direct flow passage of the fluid in an axial flow from one to the other sieve plate.

The cellular material employed should consist essentially of interconnecting individual cells so that the cellular material is of the open-cell or breathable type. That is it permits the passage of gas or liquid therethrough by a circuitous path. The preferred cellular material would be that organic foam or cellular material having a majority of open cells and particularly that material wherein the open or interconnecting cells represent over 90% of the cells of the cellular material and wherein the cell size is essentially uniform. For example, my cellular layer may comprise an organic polymeric cellular or foam layer of rigid, semi-rigid or flexible type foam material, such as urethane, vinyl or elastomeric foams. Such cellular material may be foamed by the use of typical blowing agents which on heating decompose to provide gaseous products like nitrogen or carbon dioxide which expands the material into which it was incorporated into a foam structure. Other blowing agents include those solids or liquids which upon the application of heat change to vapor to create a cellular structure. Foam material may be prepared by the use of decomposing blowing agents such as azodicarbonamide, oxybisbenzenesulfonylhydrazide, dinitrosopentamethalenetetramine as well as liquids like hydrocarbons and chloro and fluorocarbons such as Freons and tetrachlorethylene. Foams may also be created by the mechanical incorporation of a gas such as air or carbon dioxide into a latex or a plastic material.

For ease in preparing my cellular layers foam-in-place products are particularly advantageous so that the material may be poured directly onto a screen, partition element or separatory material and foamed directly within the column to create a cellular layer thereby providing also a positive seal between the cellular layer and the interior wall of a column.

My cellular trays may be employed alone or in combination with liquid or solid gel or gel like partitioning agents in the foam or coated on the surface thereof in order to provide the desired separation. If desired, the partition agent may be incorporated into the material prior to foaming.

The particular cellular sizes of a cellular layer may vary, that is, they may be larger than, the same size as, or smaller than the separatory material in the column. Preferably, the cellular size is greater than the separatory material in the column to provide for a mixing and distribution in the fluid moving through the cellular layer. For example, the cellular size may vary from a fraction of a millimeter up to about ½ inch. However, the average cell size would usually range approximately from 1/64 of an inch to ¼ inch in size, while reticulated foams used would generally have a much higher cellular size depending upon the degree of reticulation. For a larger size cellular layer, or the reticulated cellular layers, it is often desirable to prepare the cellular layer between supporting screens or elements so that a single sandwich type layer structure is prepared which may be incorporated in the column. The screens also prevent the separatory material from entering into the interior of the sandwich.

A wide variety of both organic and inorganic materials may be used to prepare cellular layers and typical polymeric materials would include both natural and synthetic elastomers like natural rubber, butadiene copolymers, styrene-butadiene copolymers, acrylonitrile and acrylonitrile-styrene and acrylonitrile-butadiene rubbers, chloroprene carboxilated elastomers and the like. Elastomeric foams may be prepared in cellular form by mechanically incorporating air into a latex or by the use of a blowing agent which decomposes. Other polymeric materials would include urethane type material such as polyurethanes like polyesters and polyethers wherein isocyanate material is reacted with water and/or an amine catalyst to form a polyurethane foam structure or wherein a reticulated urethane foam is prepared. Reticulated foams are prepared by hydrolizing the urethane elastomer with an alkaline material to dissolve the walls of the cells thereby leaving a grid-like structure of reticulated foam material. Vinyl resins such as polyvinyl chloride and copolymers of vinyl chloride and vinyl acetate and the like, as well as acrylic resins, phenol-aldehyde resins may be made and prepared in foam form. For example, vinyl chloride resin foams may be prepared by employing the vinyl chloride resins together with a blowing agent.

The foam density of my cellular material may range from about 1 to 40 pounds per cubic foot.

Brief description of the drawings

FIG. 1 is a schematic and partial cross-sectional representation of a chromatographic apparatus including in particular a chromatographic column containing cellular layers;

FIG. 2 is a partial and enlarged cross-sectional representation of my cellular layers employed wherein two or more chromatographic column sections are connected;

FIGS. 3–7 are enlarged fragmentary cross-sectional representations of various arrangements of cellular layers alone and in combination with partition elements within a chromatographic column.

Description of the preferred embodiment(s)

FIG. 1 shows a chromatographic apparatus 10 comprising an elongated cylindrical column 12 having an inlet 16 and an outlet 18 and containing therein a bed of finely divided particles such as crushed firebrick having a thin film of liquid partitioning material on the surface thereof and capable of effecting the chromatographic separation of a fluid stream such as a cis-transpentene stream into two or more chromatographic components. The crushed firebrick has an average particle size of 80 to 100 mesh. A carrier fluid such as an inert gas like helium or nitrogen is permitted to flow from a source (not shown) to an inlet conduit 20 containing a flow metering device 22, a flow control valve and pressure measuring device 26 to the column inlet 16. A conduit 28 permits the introduction of a gas sample material to be chromatographically separated into the inlet 16. Outlet 18 is in fluid flow communication with an outlet conduit 30 containing a flow control valve 32 and a sampling conduit 34. The sampling conduit withdraws a portion of effluent material from the chromatographic column and continually passes it to a detecting device such as a thermoconductivity cell 36 and then to a flow meter 38 such as a capillary type flow meter. The detecting device identifies the particular components being withdrawn from the column by detecting the thermo-conductivity of the sample gas in comparison to the carrier gas. The carrier gas serves as a base reference for comparison purposes in the thermo-conductivity cell 36 and is passed to the detector 36 from the reference conduit 41 containing flow control valve 43. The detector 36 may also be in electrical communication with a graph type recorder and an integrator.

Within a chromatographic column 12 containing the separatory material 40 is located a series of flexible polyurethane or polyvinyl cellular layers of the open cell type having a cell size larger than the particle size of the separatory material that is employed within the column. The layers have a liquid partitioning material, coated on the surface thereof. Screens 44 are provided to separate the cellular layers 42 from the separatory material 40 to prevent the separatory material 40 from blocking the flow passages of the cellular layer. One layer is located directly adjacent the inlet 16 of the column to permit the material being introduced along with the carrier fluid to spread laterally and to be introduced into the column in plug-like form. The cellular layer located within the body of the column 12 is to provide for lateral movement and radial mixing of the gas sample and carrier streams as they pass axially through the column. While directly adjacent the outlet 18 is located another cellular layer. In operation, the gas sample stream is driven axially through the column by the carrier stream and separated into distinct chromatographic fractions by the separatory material. The cellular layers 42 induce lateral flow of the streams as they move through the column and therefore provide for improved resolution.

FIG. 2 is an illustration wherein cellular layers are employed in combination at the outlet of one chromatographic column just prior to a connecting tube 52 between the outlet of one column and the inlet of the next column section 12a. In this embodiment the chromatographic columns 12 and 12a may be employed with or without any further cellular layers other than the cellular layers at the respective outlet and inlet in each pair of columns. Where more than two columns are interconnected, cellular layers can be employed at the inlets and outlets of all columns. In this arrangement the gas sample and the carrier streams are passed through the first cellular layer and further radially mixed as they join to pass through the connecting tube 52 and thereafter the radially mixed streams are distributed back into the separatory material 40 of the column 12a by the cellular layer at the inlet. FIG. 2 illustrates a connecting tube 52 between column 12 and 12a which tube is empty and relatively short. However, where desired, this tube and the connection 52 can be packed with my cellular material or with the same or different separatory material than employed within the columns.

FIG. 3 shows a cellular layer 42 employed within a chromatographic column between a pair of partition elements each having a plurality of flow passages, such as is illustrated by a pair of sieve plates 50 or sintered metal fibers or particles, or porous ceramic elements. The flow passages of the sieve plates 50 may or may not be substantially axially aligned, since the intervening layer of cellular material avoids the difficulties of employing sieve plates with aligned flow passages.

FIG. 4 shows a pair of cellular layers on either side of a doughnut type element 46 having a central flow passage. The fluid material after proceeding through the first upstream cellular layer moves inwardly through the flow passage, while the following or downstream cellular layer redistributes the radially mixed fluids from the first cellular layer and the doughnut partition element back into the separatory material of the column.

FIG. 5 illustrates a combination of another type partition element 46 employed in combination with a downstream cellular layer wherein the downstream side of the doughnut element 46 is outwardly flared or tapered 54 to aid in redistributing the mixed fluids back into the column. The cellular layer 46 has greater depth in the center than the edges to permit a more uniform front of fluid to be formed.

FIG. 6 illustrates a tapered type doughnut element 48 followed directly by a cellular layer. The tapered doughnut partition element 48 is tapered both upstream and downstream and is used to induce flow of the sample and carrier fluids towards and away from the central flow passage. The tapered shape prevents pockets of material from forming against the interior wall of the column. In the figures as illustrated screens 44 are employed to prevent the separatory material in the column from entering the flow passages of the partition element or mixing with my cellular layers.

FIG. 7 illustrates the use of a cellular layer alone without partition elements but in combination with a small disc-like empty mixing space 60 directly downstream of the layer so that fluids mixed in the layer may be redistributed by the greater pressure drop in the mixing space and across the upstream face of the separatory material 40 before introduction in the next separatory section of the column.

My invention has been described for the purposes of illustration only in connection with a gas chromatographic system, however, my invention may also be employed in other gas and liquid chromatographic systems. My invention has been illustrated in the drawings in various embodiments which illustrations are in no way intended to limit the scope of my invention.

What I claim is:

1. A chromatographic column characterized by an inlet for the introduction of a fluid sample stream to be separated and an outlet for the withdrawal of a separated chromatographic component of the sample stream, the column adapted to be used in a chromatographic system, which column contains separatory packing material therein, defining flow interstices of a predetermined size, and means to improve the resolving power of the column which means includes at least one layer of cellular material extending completely across the internal diameter of the column, the depth of the layer being from about 10 to 100% of the internal diameter of the column, the layer composed of organic polymeric cellular material comprising a plurality of interconnecting cells to permit the passage of fluid therethrough, the cells being generally uniform in size within the layer, said layer promoting the lateral dispersion of the sample stream moving axially through the column, the size of the cells in the layer being substantially greater than the size of the interstices of the separatory packing material within the column.

2. The column of claim 1 wherein the cell size of the interconnecting cells varies from about 1/64 to 1/4 inch.

3. The column of claim 1 wherein the cellular layer is a reticulated cellular material.

4. The column of claim 1 wherein the column includes at least two cellular layers.

5. The column of claim 4 wherein each cellular layer is adjacent one end of the column.

6. The column of claim 1 wherein the column includes at least two column sections wherein the outlet of the first column is connected to the inlet of the second column and wherein one cellular layer is directly adjacent the outlet of the first column and another cellular layer is directly adjacent the inlet of the second column.

7. The column of claim 6 wherein the outlet of the first and the inlet of the second columns are connected by a connecting tube which is free of material therein.

8. The column of claim 1 which contains a mixing space directly downstream of the cellular layer.

9. The column of claim 1 wherein the cellular layer includes at least one partition element containing at least one flow passage therein directly adjacent the cellular layer.

10. The column of claim 9 wherein the cellular layer includes at least one partition element, containing at least one flow passage therein within the cellular layer.

11. The column of claim 1 wherein the cellular layer includes partition elements containing a plurality of flow passages on each side of the cellular layer.

12. The column of claim 1 which includes a partition element having a central flow passage therein located within the cellular layer.

13. The column of claim 1 which includes a partition element characterized by a central flow passage therein adjacent to and directly upstream of the cellular layer.

14. The column of claim 13 which includes a partition element having at least one face which slopes inwardly toward the central portion of the column.

15. The column of claim 1 wherein the cellular layer is flexible.

References Cited

UNITED STATES PATENTS

| 3,036,020 | 5/1962 | Britain | 260—2.5 |
| 3,256,216 | 6/1966 | Erickson et al. | 260—2.5 |
| 3,310,932 | 3/1967 | Melpolder | 55—386 |
| 3,347,020 | 10/1967 | Van Venrooy | 55—386 |

FOREIGN PATENTS 663,204  5/1966  South Africa.

(Other references on following page)

OTHER REFERENCES

Scott, R. P. W.: Gas Chromatography, 1960, Butterworths, London, England, pages 240–41.

Baum, E. H.: "Evaluation of Microporous Polyethylene As a Low Temperature Gas Chromatographic Support," Journal of Gas Chromatography, Nov. 1963, pages 13–15.

Winstein, W. A.: "Reversed-phase Partition Chromatography on Microporous Polymeric Supports," Analytical Chemistry, vol. 34, No. 10, September 1962, pages 1334–35.

REUBEN FRIEDMAN, *Primary Examiner.*

J. L. DE CESARE, *Assistant Examiner.*